United States Patent
Loeb

(10) Patent No.: US 7,352,899 B2
(45) Date of Patent: *Apr. 1, 2008

(54) REALISTIC MACHINE-GENERATED HANDWRITING WITH PERSONALIZED FONTS

(75) Inventor: Michael R. Loeb, New York, NY (US)

(73) Assignee: Loeb Enterprises, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/219,092

(22) Filed: Sep. 1, 2005

(65) Prior Publication Data
US 2006/0078203 A1    Apr. 13, 2006

Related U.S. Application Data

(63) Continuation-in-part of application No. 10/962,828, filed on Oct. 12, 2004.

(51) Int. Cl.
*G06K 9/00* (2006.01)
*G06K 9/18* (2006.01)
*G06F 3/041* (2006.01)
*G06F 15/00* (2006.01)
*H04N 1/40* (2006.01)
*H04L 15/34* (2006.01)

(52) U.S. Cl. ............... 382/186; 382/187; 178/18.01; 178/19.01; 178/30; 358/1.11; 358/462; 358/478

(58) Field of Classification Search .......... 382/180, 382/186–187, 196, 197, 232, 242; 178/3, 178/4, 18.01, 18.09, 19.01, 19.04, 19.05, 178/23 R, 36, 37, 87; 358/1.11, 501, 462, 358/478; 283/45
See application file for complete search history.

(56) References Cited

U.S. PATENT DOCUMENTS

| 3,579,186 | A | * | 5/1971 | Johnson et al. | 382/121 |
| 3,938,099 | A | * | 2/1976 | Hyder | 715/535 |
| 4,244,657 | A | * | 1/1981 | Wasylyk | 400/109 |
| 4,397,033 | A | | 8/1983 | Bechet | |
| 4,454,610 | A | * | 6/1984 | Sziklai | 382/119 |
| 4,613,945 | A | * | 9/1986 | Parker | 345/471 |
| 5,013,874 | A | | 5/1991 | de Bruyne et al. | |

(Continued)

OTHER PUBLICATIONS

Srihari et al., IEEE, 2001, "Establishing Handwriting individuality using pattern recognition techniques" (pp. 1195-1204).*

(Continued)

*Primary Examiner*—Bhavesh M Mehta
*Assistant Examiner*—Manav Seth
(74) *Attorney, Agent, or Firm*—Johnson & Scaturro, LLC; Christine Johnson, Esq.; Michael Scaturro, Esq.

(57) ABSTRACT

There are provided new and improved methods and systems for producing machine-generated handwriting having realistic human appearance. In various embodiments, the handwriting may include characteristics of particular classes and/or characteristics of particular individuals. The handwriting includes an appropriate degree of randomness so as to be realistic in appearance. In a particular embodiment of the invention, at least one sample of a particular individual's handwriting is scanned and analyzed to determine the characteristics thereof. The handwriting characteristics include a degree of randomness representative of the scanned handwriting sample(s). The handwriting may be printed on a conventional printer, for example to generate a communication for a recipient.

8 Claims, 4 Drawing Sheets

U.S. PATENT DOCUMENTS

| | | | |
|---|---|---|---|
| 5,108,206 A * | 4/1992 | Yoshida | 400/61 |
| 5,327,342 A * | 7/1994 | Roy | 345/467 |
| 5,412,771 A * | 5/1995 | Fenwick | 345/468 |
| 6,256,410 B1 * | 7/2001 | Nathan et al. | 382/187 |
| 6,298,154 B1 * | 10/2001 | Cok | 382/186 |
| 6,381,344 B1 | 4/2002 | Smithies et al. | |
| 6,940,617 B2 * | 9/2005 | Ma et al. | 358/1.15 |
| 2001/0026262 A1 * | 10/2001 | Van Gestel et al. | 345/156 |
| 2001/0048436 A1 * | 12/2001 | Sanger | 345/467 |
| 2002/0046121 A1 | 4/2002 | Walker et al. | |
| 2003/0063045 A1 | 4/2003 | Fleming | |

OTHER PUBLICATIONS

"Advanced Typographic Extensions—Open Type Layout", [www.microsoft.com/typography/otspec/TTOCHAP1.htm], Microsoft Corporation,(Mar. 22, 2001),1-7.

"Handwriting Services", http://www.thednrgroup.com/Pages/Machined_Handwriting.html, (Aug. 19, 2004),1 pg.

Steinberg, Jacques , et al., "The Troubling Case of the Phantom Reader", www.nytimes.com, (Jun. 28, 2004),4 pgs.

* cited by examiner

REALISTIC MACHINE-GENERATED HANDWRITING WITH PERSONALIZED FONTS

RELATED APPLICATIONS

The present application is a continuation in part of U.S. patent application Ser. No. 10/962,828 filed on Oct. 12, 2004, titled: Realistic Machine-Generated Handwriting.

FIELD OF THE INVENTION

The present invention relates generally to methods and systems for generating handwriting and more particularly to methods and systems for machine-generating realistic handwriting.

BACKGROUND OF THE INVENTION

Many different, commercially available methods and systems are known for printing machine-generated handwriting, typically for the purpose of generating machine-signed checks. To name just a few, machine-based check signers, typically electronic signature printers, are currently manufactured and sold by: AcuPrint, Standard Register, Hedman, Speedrite, Paymaster and Wycom.

Electronic signature generators are designed to generate secure signatures for legal documents such as checks. For security purposes, electronic signature generators are designed to print signatures that are substantially identical from one to another. These signatures are easily readable by bank check processing machines but not easily forged by others. Check signing machines facilitate the printing of hundreds of thousands of checks per day by large businesses.

In addition to machine-generated signature machines, different systems have been developed for capturing and analyzing hand-written signatures. See, for example: U.S. Pat. No. 4,397,033 to Bechet, titled: Device for Measuring Characteristic Parameters of the Speed of Handwriting, U.S. Pat. No. 5,013,874 to de Bruyne et al., titled: Apparatus for Recording and Verifying Handwriting, in Particular Signatures, and U.S. Pat. No. 6,381,344 to Smithies, et al, titled: Method and System for the Capture, Storage, Transport, and Authentication of Handwritten Signatures. U.S. patent application publication 2003/0063045 A1 to Fleming, titled: Pen Cartridge that Transmits Acceleration Signal for Recreating Handwritten Signatures and Communications, shows a system for transmitting a pen-written signature to a computer device.

As the reader will discern, methods and systems relating to machine-generated writing are generally concerned with the consistency of the writing and the ability to verify signatures, while methods and systems dealing with handwritten signatures are generally concerned with capturing and/or analyzing such signatures.

While machine printed handwriting is useful for legal documents, it is not particularly desirable for other types of written communications. With the availability of flexible, high-speed printers such as laser printers, machine-generated cursive writing is used pervasively in mass mailings such as business-to-customer mailings and direct marketing mailings. Most word processing and printing systems support the use of a variety of cursive scripts printable on commercial printers. Depending on the nature of a communication, cursive script may be used for addressing, the entirety of a communication or to personalize a portion of the communication such as an address or a signature.

Machine-generated cursive writing, however, suffers from the disadvantage of having the appearance of being machine-generated. As discussed above, machine-generated cursive writing is, typically, highly consistent in cursive writing characteristics. While consistency is desirable for some applications, for example signatures on legal documents, consistency is undesirable in the context of personalized communications to customers. Such attempts at personalized communications are often perceived by the recipient as machine-generated mass communications, or "junk mail," and as such are often ignored. If a customer perceives machine-printed, cursive writing on the face of a letter, such as in the addressing, a communication may be disposed of without even being opened.

In fact, at least one company exists for the purpose of generating real, hand-written communications for clients. The reader is directed to the DNR Group, Inc., which provides genuine handwritten communications for businesses to use. DNR Group, Inc. further supplies a service called 'machined handwriting' where actual penmanship is transposed by a machine operating a ballpoint pen. However, thus machined writing can not be personalized and is useful only for the writing of short phrases, such as signatures and slogans. It further requires the use of slow, complex ballpoint pen machines.

The present inventors have determined that it would be quite useful to be able to machine generate cursive writing that has the appearance of real, human handwriting. As such, it will more likely be received as a sincere, personal communication deserving of the attention of the recipient.

SUMMARY OF THE INVENTION

The present invention provides methods and systems for generating realistic, machine-printed handwriting. The invention enables the use of selected handwriting class characteristics and personal characteristics, as well as random variations on those characteristics, to provide machine-generated writing that realistically imitates handwriting. In accordance with a particular embodiment of the invention, the machine-generated handwriting characteristics are determined by scanning and analyzing the writing sample(s) of a particular individual. The machine-generated handwriting characteristics include a degree of randomness representative of the scanned handwriting sample(s).

In accordance with one embodiment of the invention there are provided methods and systems for machine-generating a realistic handwritten communication, a method comprising: scanning at least one handwriting sample of an individual; analyzing the scanned handwriting sample; generating, based on the scanning and analyzing, a set of handwriting characteristics, the set of handwriting characteristics including a degree of randomness; selecting a recipient; selecting a communication including content for the recipient; and printing the communication using the selected set of handwriting characteristics.

In accordance with one embodiment of the invention there are provided methods and systems for machine-generating a realistic handwritten communication, a method comprising: scanning at least one handwriting sample of an individual; analyzing the scanned handwriting sample to generate a set of handwriting characteristics, the set of handwriting characteristics including a degree of randomness representative of the at least one handwriting sample; selecting content for a communication; and printing the communication with the selected handwriting characteristics, including the selected degree of randomness, on a printer.

BRIEF DESCRIPTION OF THE DRAWING FIGURES

These and other objects, features and advantages of the invention will become apparent from a consideration of the detailed description of the invention when read in conjunction with the drawing Figures, in which.

DETAILED DESCRIPTION OF THE INVENTION

The present invention enables the machine generation of realistic handwriting. As used herein, the term "handwriting" and variants thereof means machine-generated print that, in accordance with the invention described below, has the appearance of realistic human handwriting. Handwriting includes both cursive and printed writing. In various embodiments, the machine-generated handwriting may be selected based on combinations of one or more of: demographic class characteristics, individual characteristics and random characteristics. The invention enables the machine-generation of communications that have the appearance of having been handwritten.

Figure 1:
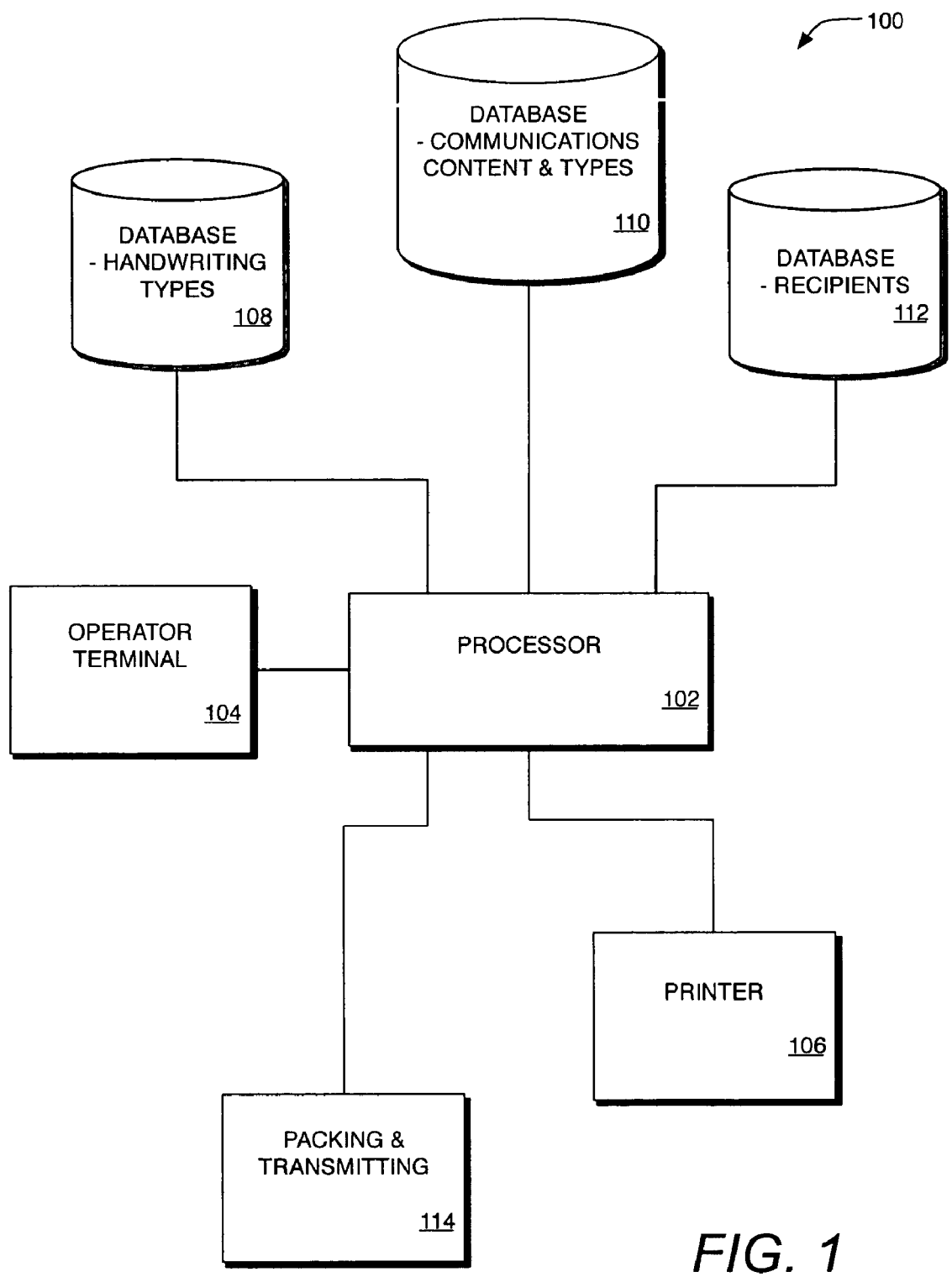
FIG. 1 is a block diagram illustrating a machine-generated writing system in accordance with the present invention.

With reference to FIG. 1, there is shown a system 100 for providing written communications including realistic, machine-generated handwriting. The system includes a controller or processor 102 connected to an operator control terminal 104 and a printer 106. Further connected to processor 102 is a database 108 of handwriting types, a database 110 of communication types and content and a database 112 of recipient data. A packing and mailing system for packaging and transmitting written communications is included in system 100.

Processor 102 comprises a conventional computer system operating under a conventional operating system, many types of which are known in the art. One example comprises a personal computer including an Intel® processor operating the Microsoft Windows® operating system. Numerous other systems comprising workstations, servers, mainframes and combinations thereof are known to the reader.

Databases 108, 110 and 112 comprise conventional data storage systems, for example comprising appropriate combinations of semiconductor, magnetic and optical storage components. While the databases have, for purposes of explanation, been shown as three separate devices, it will be understood that they may comprise one or more storage devices capable of storing the data and control software described herein.

Operator terminal 104 comprises a conventional human operator interface, for example a keyboard and display screen. Printer 106 comprises a printer type capable of printing user-defined fonts, many of which are known in the art. For example and without limitation, most dot-matrix, laser and inkjet printers are capable of printing user-definable type fonts in the format, for example, of True Type® and Postscript® type font formats. Numerous software programs and techniques will be known to the reader through which a user may design a custom type font.

Figure 2:
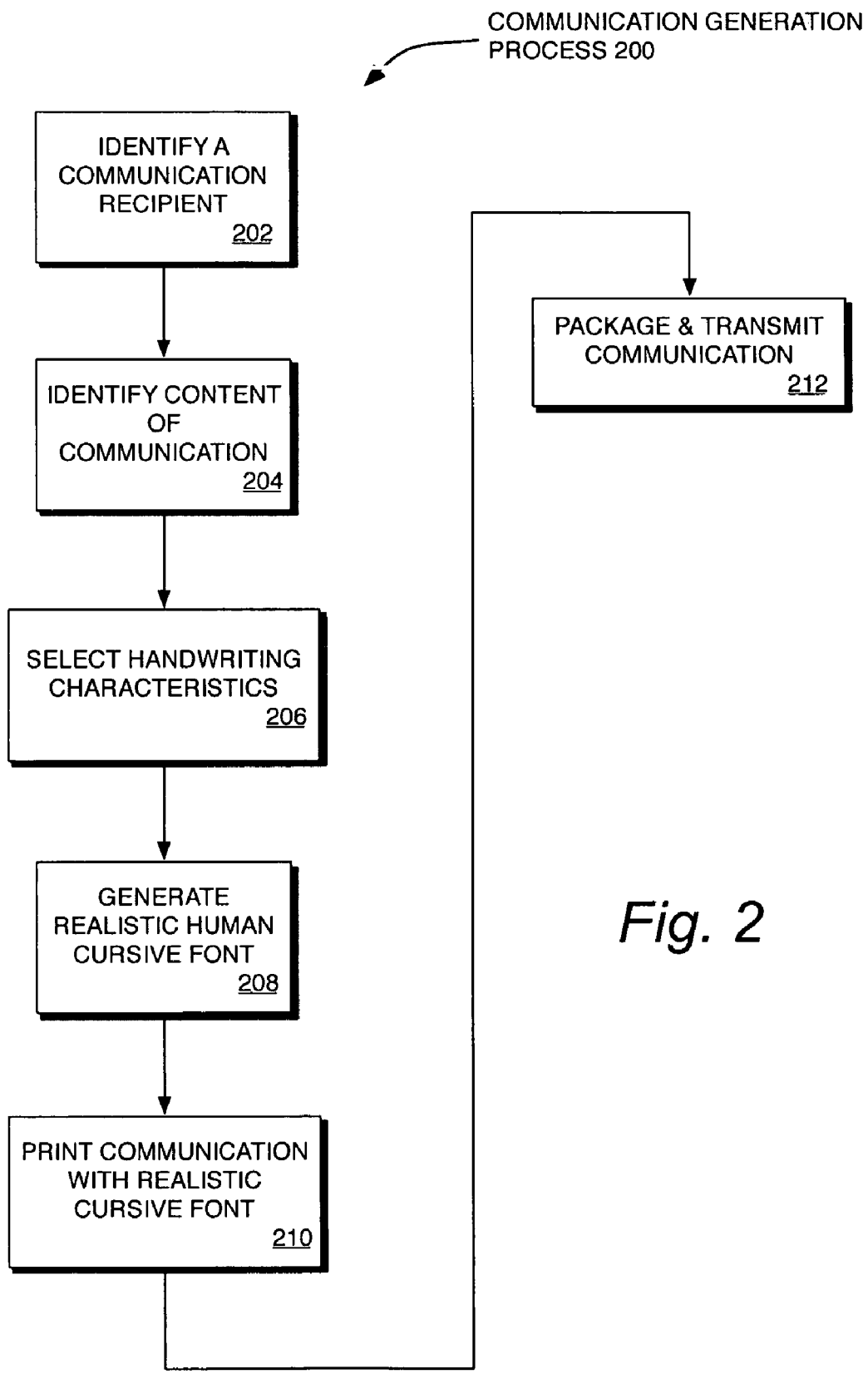
FIG. 2 is a flow chart showing a process for printing machine-generated communications in accordance with the present invention.

With reference now to FIG. 2, there is shown a process 200 for generating communications having realistic, machine-generated handwriting. There is first identified a recipient of (step 202) and content for (step 204) a communication. As noted above, numerous communication types and contents are stored in database 110, while recipient information such as name, mailing address and demographic information are stored in database 112. Based on the selected recipient and content, there is then determined the desired characteristics of the handwriting (step 206).

Figure 3:
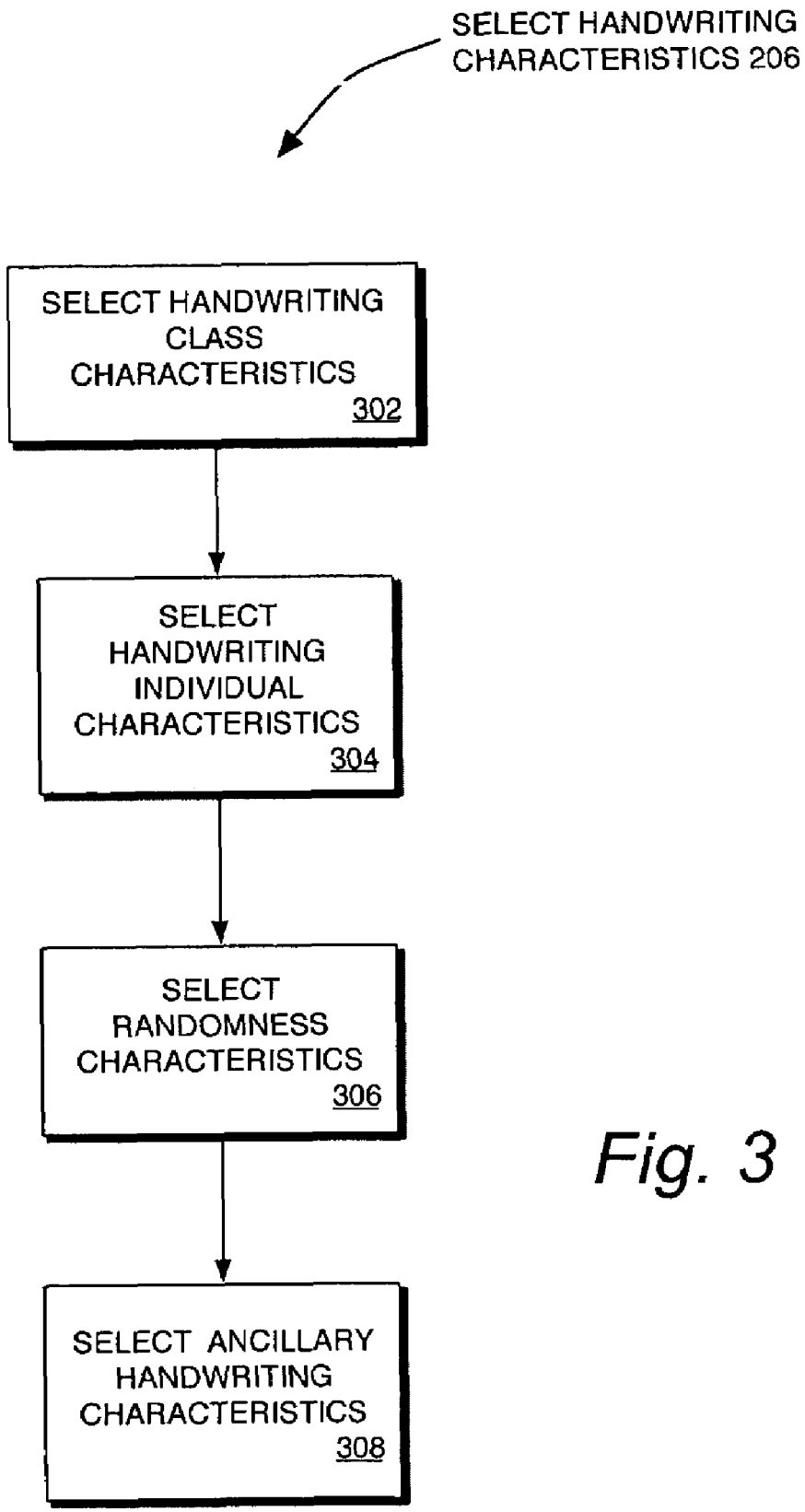
FIG. 3 is a flow chart showing details of the process for selecting handwriting characteristics from FIG. 2.

With reference now to FIG. 3, it will be understood that human handwriting comprises two general types of characteristics, class characteristics common to a group and individual characteristics particular to each individual. Class characteristics are determined, amongst other ways: i) by the instruction provided to a class of writers, typically during schooling when the particular class is taught how to write, ii) by the physical characteristics of the writers, and iii) by the materials provided for writing. Handwriting class characteristics may thus vary across many different types of demographic groups, including but not limited to: age, geographic location, ethnicity, gender and others.

As is known to the reader, while everyone may receive the same training and education relating to writing, individual physical skills as well as interpretations of the training vary. Thus, no two individuals will have the same handwriting and in fact no single individual is likely to write the same letter, word or phrase identically twice.

Further as is known to the reader, each user's handwriting is distinguished by a plurality of mechanical characteristics. Handwriting characteristics include, but are not limited to: pressure, size, slant, loop types, retracements, "t" crossings and lower-case "i" dottings. The science of forensic document examination is directed to handwriting analysis to determine the legitimacy and originality of documents, focusing on mechanical handwriting characteristics. The science of graphology is directed to handwriting analysis to determine personal information about the writer.

Class characteristics are well known in the field of handwriting analysis. In accordance with the present invention, handwriting class characteristics, for example in the form of the mechanical characteristics described above, are stored in database 108 of system 100. Individual characteristics are likewise stored in database 108, again for example in the form of mechanical characteristics. Both class and individual characteristics may be determined, for example, through the collection, analysis and characteristic determination of real handwriting samples so as to build a large database of individual handwriting types within class types.

As was noted above, randomness plays a significant role in real handwriting. As noted, no two individuals have identical handwriting and no single individual writes the same letter, word or phrase in the identical manner twice. Even a person's signature, typically his or her most repeated writing, contains slight variations in every occurrence. In accordance with another feature of the present invention, this randomness is represented in the machine-generated handwriting of the present invention. This randomness can be created in many different ways. For example, the randomness in various class and individual handwriting characteristics can be created by: 1) the evaluation of the random mechanical variations in actual handwriting samples, each randomness stored in database 108 in association with its sample, and/or 2) the generation of random variations of stored handwriting samples based on mechanical variations within an acceptable range of normalcy. Further, random variations may be determined specific to each handwriting class.

For example, analysis may be done on a particular class of handwriting to determine normal random variations for the mechanical characteristics of that class. One specific example would be the range of 'roundness' of "o's" as a percentage deviation from the average shape for the class. Another example is range of height of the "t" crossings as a percentage deviation from the average height for the class. The normal distribution of the randomness is then stored mathematically in a manner enabling its retrieval and use in generating printed communications. Numerous other random variations within classes, as well as methods for analyzing, recording and using them, will now be apparent to the reader.

In another example, analysis may be done on a particular individual's handwriting to determine normal random variations for the mechanical characteristics of the individual. Specific examples would be the angular ranges of slant and the ranges of pressure as a percentage deviation from the averages for the individual. As described above, the normal distribution of the randomness is then stored mathematically in a manner enabling its retrieval and use in generating printed communications. Numerous other random variations for an individual, as well as methods for analyzing, recording and using them, will now be apparent to the reader.

Continuing with reference to FIG. 3, the process of selecting handwriting characteristics for a particular communication thus includes the steps of selecting class characteristics (step 302) and optionally the characteristics of an individual within the class (step 304). The randomness for the selected handwriting is then selected (step 306). In one embodiment of the invention, the desired randomness for the handwriting characteristics is simply selected to be the actual determined randomness resulting from analyzing the selected individual handwriting sample. In another embodiment of the invention, the desired randomness for the handwriting characteristics is selected based on the determined randomness characteristics for the class as described above.

In yet another embodiment, the handwriting of a particular individual may be selected without regard to his or her class, for example when it is desired to simulate a handwritten communication from a particular individual. In such instances, step 302 is omitted.

Ancillary characteristics for the handwriting are then selected (step 308), exemplary ancillary characteristics including ink color and ink type.

In accordance with a feature of the present invention, the particular handwriting characteristics of a communication can be selected based upon what is known of the recipient demographics and the content of the communication. To illustrate this feature of the invention, and without limitation, the following examples are offered.

EXAMPLE 1

Communication: An informal marketing solicitation is to be mailed to a group of teenage girls in a particular ethnic group.
Handwriting Characteristics: The handwriting class may be selected to be that of teenage girls in the particular ethnic group. No individual characteristics need to be selected. The communication thus has the appearance of being from a peer.

EXAMPLE 2

Communication: A letter from a Swiss bank to its customers regarding a new product.

Handwriting Characteristics: The handwriting characteristics may be selected to be those of the bank president, providing the appearance of a personalized letter. It will thus be appreciated that this is an example of the selection of the handwriting characteristics of a particular individual in lieu of the handwriting characteristics of a class.

EXAMPLE 3

Communication: A series of communications from a professional association to members as a cover letter for a professional newsletter.
Handwriting Characteristics: The handwriting class is selected to be that of women, middle-age. A different individual set of characteristics is selected for each communication so as to provide the appearance of a different personal letter with each mailing. Random characteristics representative of the class may be substituted for any particular individual's writing.

It will be understood that different handwriting characteristics may be selected for different pieces of a single communication. For example, distinctly different handwritings may be selected for the addressing and contents of a letter communication.

With reference back to FIG. 2, subsequent to the selection of the desired handwriting characteristics, a printable font is developed on system 100 for printing on printer 106 (step 208). One method for generating realistic handwriting is to develop a font for printing on a conventional printer such as a laser or inkjet printer. Many different software programs are known in the art for designing and/or editing True Type® and Postscript® type fonts. Examples include: FontLab™ tools, Font Creator by topshareware™, tools by High Logic™ and others as will be known to the reader. Similar tools are known for designing and editing fonts for other types of printers including dot matrix printers.

In accordance with the present invention, the characteristics stored in database 108 and selected in accord with the above-described process are retrieved and used with an appropriate font design tool to generate the desired realistic handwriting (step 208). Multiple fonts may be generated and/or multiple variations of characters within a font may be generated as required to obtain the desired randomness. The communication is printed (step 210) on printer 106 and packaged for transmission to the recipient (step 212). Written communications to the selected recipients may be in one or more of many known forms, including: e-mail, letters, cards, circulars, newsletters and numerous others as will be apparent to the reader.

Figure 4:
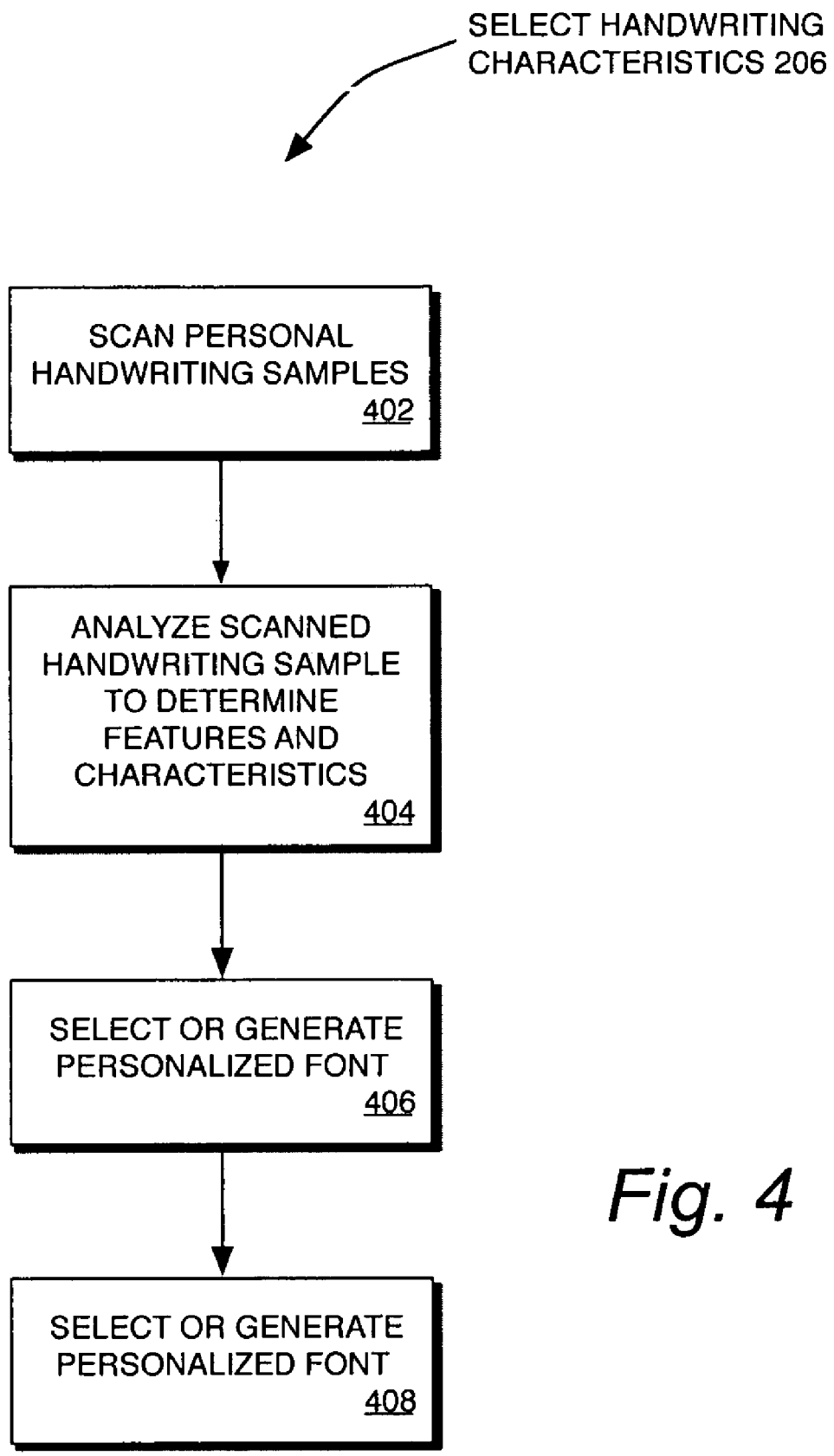
FIG. 4 is a flow chart showing a process for generating personalized handwriting fonts in accordance with an alternate embodiment of the invention.

With reference now to FIG. 4, there is shown the details of process 206 for machine-generating handwriting representative of a particular individual. In accordance with this embodiment of the invention, actual personal writing samples are collected, electronically scanned and analyzed to determine the handwriting characteristics of the selected individual.

Continuing with reference to FIG. 4, there are collected and scanned the personal handwriting samples of the selected individual (step 402). Sufficient samples are scanned whereby to facilitate an analysis of the actual handwriting sample (step 404) and to discern the various features and characteristics of the actual individual's handwriting. As noted above, each individual's handwriting characteristics may include combinations of class characteristics, individual characteristics and random variations. As further noted above, these characteristics may be measured, analyzed and characterized in a straightforward way.

Subsequent to the analysis of the handwriting sample, there is either selected or generated a personalized font with sufficiently similar characteristics to simulate the actual handwriting (step 406). This can be performed by first comparing the characteristics of the scanned handwriting to those of existing, stored fonts. If an appropriate similar font exists, it is selected for use. If an appropriate font does not exist, a new font is generated in accordance with the processes described herein above. It will be understood that a font is deemed to be sufficiently similar if it can realistically simulate the actual handwriting sample of the desired individual such that the font is generally indistinguishable from the actual handwriting as determined by a reader.

With reference back to FIG. 2, subsequent to the selection or generation of a personalized font (step 406), there are inserted the various random and ancillary characteristics described in detail herein above (step 408), with the random characteristics determining based upon the analysis of the scanned handwriting samples. There is thus generated and made available for printing a machine-printable font personalized to the handwriting of a particular person. With reference back to FIG. 2, communications may now be printed (step 210) and distributed (step 212) in accordance with the above-described processes.

It will be appreciated that a personalized font of the above-described type can be used for personal communications between a sender and recipients familiar with his or her handwriting.

There have thus been provided new and improved methods and systems for producing machine-generated handwriting having realistic human appearance. In various embodiments, the handwriting may include characteristics of particular classes and/or characteristics of particular individuals. The handwriting includes an appropriate degree of randomness so as to be realistic in appearance. The handwriting may be printed on a conventional printer, for example to generate a communication for a recipient.

While the invention has been described with respect to particular embodiments, it is not thus limited. Numerous changes and improvements within the scope of the invention will now be apparent to the reader.

What is claimed is:

1. A method of machine-generating a realistic handwritten communication comprising:
   scanning at least one handwriting sample of an individual;
   analyzing the scanned handwriting sample to generate a set of handwriting characteristics associated with the individual, the set of handwriting characteristics including a degree of randomness;
   storing the at least one set of handwriting characteristics associated with the individual in a memory;
   selecting a recipient for a realistic handwritten communication;
   selecting handwriting characteristics for the realistic handwritten communication based upon demographics of the recipient;
   retrieving from the memory one of the at least one stored set of handwriting characteristics based upon the demographics of the recipient and the characteristics associated with the individual;
   selecting a communication including content for the recipient; and
   printing the communication using the handwriting characteristics associated with the individual.

2. The method of claim 1 and further including the step of transmitting the printed communication to the recipient.

3. The method of claim 1 wherein the degree of randomness is determined based upon the scanning and analysis of the at least one handwriting sample.

4. The method of claim 1 wherein the step of printing the communication includes the steps of: generating at least one printer font representing the selected set of handwriting characteristics; selecting a printer; and printing the communication using the generated printer font on the printer.

5. A system for machine-generating a realistic handwritten communication comprising:
   means for scanning at least one handwriting sample of an individual;
   means for analyzing the scanned handwriting sample to a set of handwriting characteristics associated with the individual, the set of handwriting characteristics including a degree of randomness;
   means for storing the at least one set of handwriting characteristics associated with the individual;
   means for selecting a recipient for a realistic handwritten communication;
   means for selecting handwriting characteristics for the realistic handwritten communication based upon demographics of the recipient;
   means for retrieving from the memory one of the at least one stored set of handwriting characteristics based upon the demographics of the recipient and the characteristics associated with the individual;
   means for selecting a communication including content for the recipient; and
   means for printing the communication using the handwriting characteristics associated with the individual.

6. A system for machine-generating a realistic handwritten communication, comprising:
   a processor; a scanner connected to the processor; a printer connected to the processor; a memory connected to the processor and containing instructions for controlling the operation of the processor to perform the steps of:
   scanning at least one handwriting sample of an individual;
   analyzing the scanned handwriting sample to generate a set of handwriting characteristics associated with the individual, the set of handwriting characteristics including a degree of randomness;
   storing the at least one set of handwriting characteristics associated with the individual in a memory;
   selecting a recipient for a realistic handwritten communication;
   selecting handwriting characteristics for the realistic handwritten communication based upon demographics of the recipient;
   retrieving from the memory one of the at least one stored set of handwriting characteristics based upon the demographics of the recipient and the characteristics associated with the individual;
   selecting a communication including content for the recipient; and
   printing the communication using the handwriting characteristics associated with the individual.

7. The system of claim 5 wherein the means for printing the communication includes means for generating at least one printer font representing the selected set of handwriting characteristics; means for selecting a printer, and means for printing the communication using the generated printer font on the printer.

8. The system of claim 7 wherein the means for printing is selected from the group including a laser printer and an inkjet printer.

* * * * *